(12) United States Patent
Champonnois et al.

(10) Patent No.: US 8,585,824 B2
(45) Date of Patent: Nov. 19, 2013

(54) METHOD OF ABLATING A SURFACE LAYER OF A WALL, AND ASSOCIATED DEVICE

(75) Inventors: François Champonnois, Bures sur Yvette (FR); François Beaumont, Saulx-les-Chartreux (FR); Christian Lascoutouna, Souzy la Briche (FR)

(73) Assignee: Commissariat à l'Energie Atomique et aux Energies Alternatives (FR)

( * ) Notice: Subject to any disclaimer, the term of this patent is extended or adjusted under 35 U.S.C. 154(b) by 336 days.

(21) Appl. No.: 13/140,614

(22) PCT Filed: Dec. 18, 2009

(86) PCT No.: PCT/EP2009/067541
§ 371 (c)(1),
(2), (4) Date: Jun. 17, 2011

(87) PCT Pub. No.: WO2010/070107
PCT Pub. Date: Jun. 24, 2010

(65) Prior Publication Data
US 2011/0315666 A1    Dec. 29, 2011

(30) Foreign Application Priority Data
Dec. 19, 2008    (FR) ..................................... 08 07280

(51) Int. Cl.
*A62D 3/17*    (2007.01)
*B23K 26/36*    (2006.01)

(52) U.S. Cl.
USPC ............... 134/1; 588/306; 588/405; 588/407; 219/121.76

(58) Field of Classification Search
USPC ............. 219/121.76, 121.77, 121.68, 121.69; 134/1; 588/306, 405, 407, 900; 425/174
See application file for complete search history.

(56) References Cited

U.S. PATENT DOCUMENTS

| 5,882,487 | A  | * | 3/1999  | Li et al. ..................... 204/157.41 |
| 5,986,234 | A  | * | 11/1999 | Matthews et al. ......... 219/121.68 |
| 8,330,073 | B2 | * | 12/2012 | Champonnois et al. .. 219/121.68 |
| 2004/0232096 | A1 | * | 11/2004 | Smith ........................... 211/113 |
| 2011/0042201 | A1 | * | 2/2011  | Von Gutfeld et al. ......... 204/200 |
| 2012/0053387 | A1 | * | 3/2012  | Thro et al. .................... 588/306 |

FOREIGN PATENT DOCUMENTS

FR    2887161 A1    12/2006
WO    2007101112 A1    9/2007

OTHER PUBLICATIONS

International Search Report PCT/EP2009/067541, dated May 10, 2010.

* cited by examiner

*Primary Examiner* — Samuel M Heinrich
(74) *Attorney, Agent, or Firm* — Lerner, David, Littenberg, Krumholz & Mentlik, LLP

(57) ABSTRACT

The invention relates to a method of ablating a surface layer of a wall by sweeping the said layer, comprising: a step of directional control by an optical deflector of a plurality of pulsed laser beams; a step of ablating the layer on impact zones created by the plurality of laser beams, each impact zone being defined by a centre and by a characteristic dimension; the method is characterized in that the impact zones are disjoint, the distance between each centre of the impact zones being equal to at least ten times the largest characteristic dimension of the impact zones. The invention also relates to a corresponding device.

8 Claims, 5 Drawing Sheets

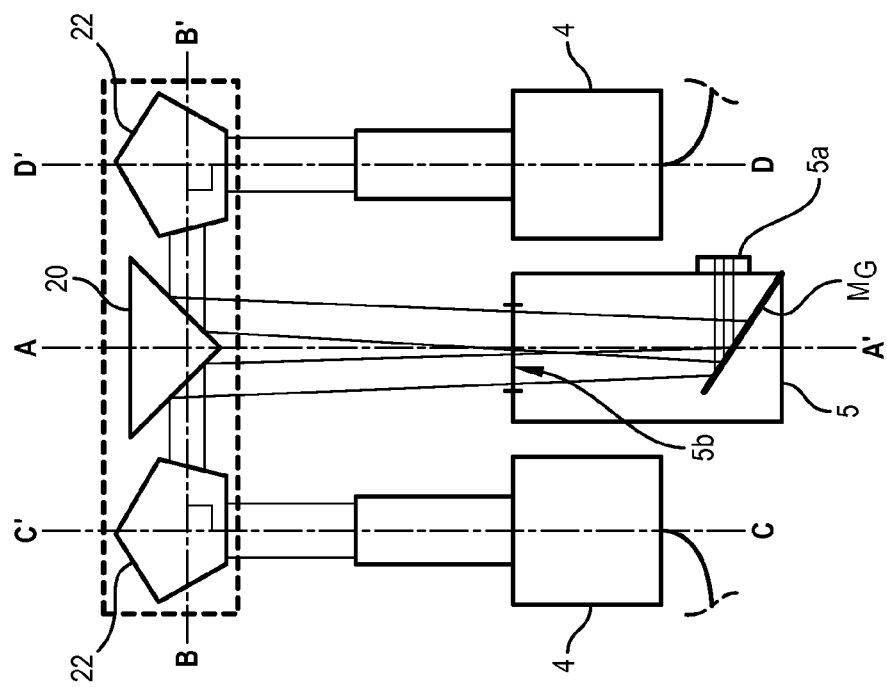
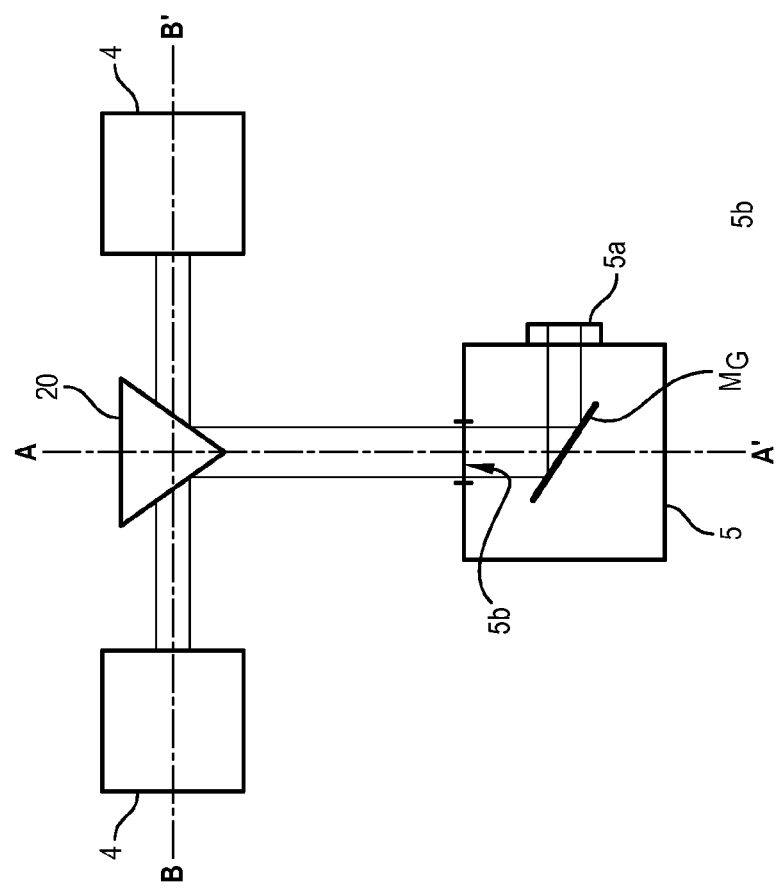

METHOD OF ABLATING A SURFACE LAYER OF A WALL, AND ASSOCIATED DEVICE

CROSS REFERENCE TO RELATED APPLICATIONS

The present application is a national phase entry under 35 USC § 371 of International application No. PCT/EP2009/067541, filed Dec. 18, 2009, which claims the benefit of and priority to French Patent Application No. 0807280, filed Dec. 19, 2008, the entire disclosures of which are incorporated herein by reference.

GENERAL TECHNICAL FIELD

The invention relates to a method of laser ablating a surface layer of a wall such as a painted wall finish, for example in a nuclear installation, and a device for implementing said method.

STATE OF THE PRIOR ART

The decontamination and the clean up of nuclear installations that have become obsolete or have reached their age limit have become a priority for the nuclear industry.

It is endeavoured to clean the contaminated parts of these installations, while avoiding producing waste also contaminated and trying to minimise cleaning effluents.

For a large part of the walls of nuclear premises, a simple removal of the paint is sufficient.

The techniques used currently are in particular stripping by means of a grinder, a nibbler, by sanding or by chemical gels.

The main interest of these techniques is their simplicity of technological implementation. However, they have drawbacks such as their high cost, directly ascribable to human intervention in an irradiated environment, the considerable release of dust in the premises and the amount of waste generated.

Another known solution for carrying out the decontamination of nuclear installations consists in using laser ablation.

Laser ablation consists in removing a layer of reduced thickness of the contaminating material to be removed, via the interaction of a coherent and focused light from a pulsed laser with said material.

The rapid heating of the surface of this layer causes the vaporisation then the ejection of the first strata of the material. This laser ablation technique is also applicable to other non nuclear fields.

Laser ablation devices typically comprise a source laser provided to generate a pulsed beam laser and means of transporting said beam to a stripping head located downstream of the laser source, and which is provided with an optical system for focusing the shots on the layer to be ablated.

The current trend of those skilled in the art consists in increasing not only the number of laser pulses applied successively to a same point, but also the power of the laser shots used in these ablation methods by pulsed laser, in order to improve the ablation efficiency, these powers being typically of the order of several hundreds of watts. The result is servitudes (in other words necessary supplies in electricity and compressed air, in particular) and penalising operating constraints, as well as a relatively high volume and implementation cost.

Another consequence resides in the diameter of the focused beam having been delivered by such lasers, which is of the order of several millimeters, in order to obtain the requisite surface power, neither too high nor too small, as a function of the material to be treated. Given these large diameters, the high rate of fire and the achievable beam movement speeds, the superimposition of shots is inevitable. Yet, said superimposed shots have the drawback of favouring re-depositions of ablated material, requiring the operator to make several passes during the sweeping of the surface to be ablated to reduce the importance thereof. The efficiency of the ablating operation is accordingly penalised.

To overcome these drawbacks, the document FR 2 887 161 describes a method of ablating a surface layer of a wall by sweeping said layer, comprising a step of directional control by an optical deflector of a plurality of pulsed laser beams.

FIGS. 1a and 1b show that the method of this document is characterised in that the impact zones of each beam on the layer are juxtaposed, either by two (see zones 6a and 6b of FIG. 1a) or by four, juxtaposed along the lines 6a, 6b and with if appropriate an overlap layer along the columns 6c, 6d (see FIG. 1b). The layout of four impacts (see FIG. 1b) obviously makes it possible to double the ablating speed compared to a layout with two impacts (see FIG. 1a).

Thus, thanks to the multiplexing of several small lasers, the efficiency of the method is increased in a manner proportional to the number of lasers used.

Nevertheless, such layouts have drawbacks.

Firstly, in order to be able to juxtapose the impact zones as in FIGS. 1a and 1b, it is necessary to conceive a complex and costly optical chain in the ablating device. Indeed, in the case represented, the layout of the impact zones needs to be precise.

Moreover, such an ablating device is provided to be used on worksites, and the aforementioned optical chain is very sensitive to exterior vibrations.

Finally, the device requires an extremely precise time synchronisation of the laser pulses (of the order of a nanosecond), in order to avoid re-depositions of material at the moment of the different impacts.

DESCRIPTION OF THE INVENTION

The invention makes it possible to do away with the difficult design of the optical chain and time synchronisation, while at the same time making it possible to use laser beams of low power. The device according to the invention is less sensitive to disturbances due in particular to vibrations.

Thus, according to a first aspect, the invention relates to a method of ablating a surface layer of a wall by sweeping said layer, comprising: a step of directional control by an optical deflector of a plurality of pulsed laser beams; a step of ablating the layer on impact zones created by the plurality of laser beams, each impact zone being defined by a centre and by a characteristic dimension.

The method of the invention is characterised in that the impact zones are disjointed, the distance between each centre of the impact zones being equal to at least ten times the largest characteristic dimension of the impact zones.

By having impact zones disjointed in this way, there is no longer the difficulty of design and adjustment of the optical chain, and time synchronisation, while avoiding re-depositions of ablated material. Indeed, due to the distance between the impact zones, at each impact, dusts of ablated materials are certainly projected on either side of the impact zone, but do not influence in anyway another laser beam.

And according to a second aspect, the invention relates to an ablating device for the implementation of the method according to the first aspect of the invention.

The device according to the invention comprises: a plurality of laser sources adapted to generate pulsed laser beams; an optical deflector downstream of the laser heads to deflect beams on a surface layer of a wall; and a guiding device adapted to guide the beams generated to an entrance pupil of the optical deflector, the entrance pupil being of the order of magnitude of the laser beams.

The device according to the invention is of lower complexity compared to known devices, since it does not require any alignment device in the optical chain, or time synchronisation of shots. Moreover, the device of the invention is not very sensitive to exterior vibrations, since the alignment constraint is eliminated.

DESCRIPTION OF DRAWINGS

Other characteristics and advantages of the invention will be become even clearer from the description that follows, which is purely illustrative and non limiting, and should be read with reference to the appended figures in which, apart from FIGS. 1a and 1b already discussed:

FIGS. 8a, 8b, 8c and 8d illustrate configurations of a device for guiding a beam to an optical deflector of the device according to the invention.

DETAILED DESCRIPTION

Figure 2:
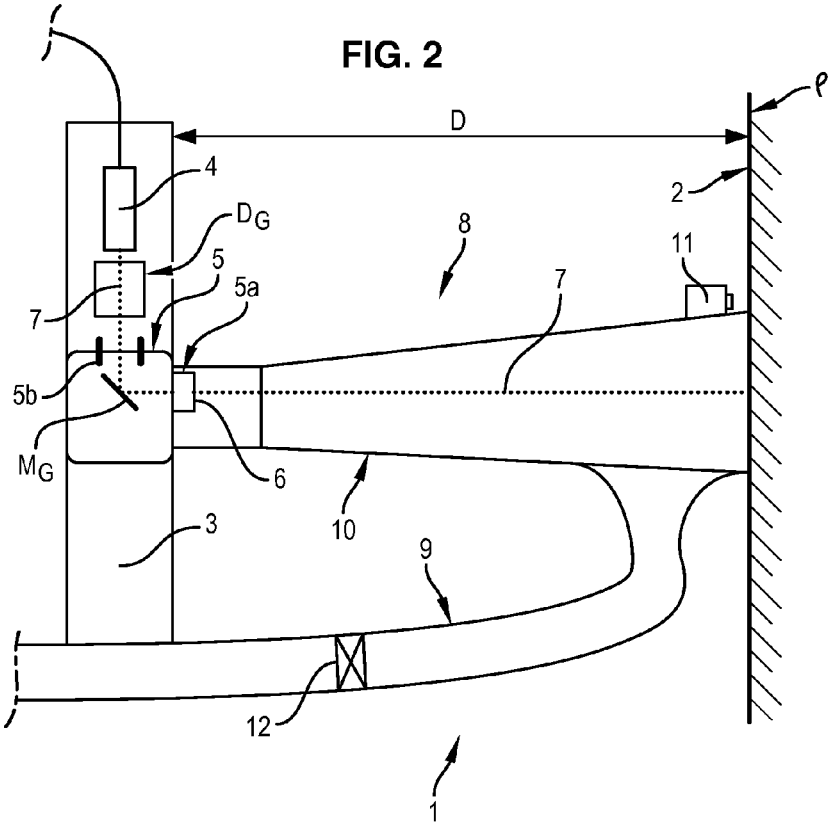
FIG. 2 illustrates a schematic side view of a device according to the invention.

In FIG. 2 is illustrated an ablating device for ablating a layer 2 of wall paint from a wall P to be decontaminated, for example in a nuclear installation, said coating 2 corresponding to a surface known as category 1 in this field (in other words with a contamination by aerosols fixed by the paint).

The invention obviously applies to fields other than the nuclear field.

Figure 1A:
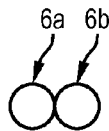
Figure 1B:
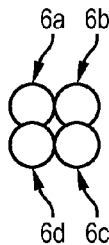

The ablating device 1 comprises a frame 3 on which are assembled:
  a plurality of laser sources 4 (only one is represented in the example of FIG. 1) connected to pumping means (not illustrated);
  an optical deflector 5 which is provided downstream of the laser sources 4 to receive the laser beams 7 and deflecting them such that they are activated by a sweeping movement. The deflector 5 advantageously comprises at its output a deflection head 5a comprising a focusing lens 6 to focus the laser beams 7 on the surface of the layer 2 to be ablated; and
  a confinement unit 8 of the space between the deflector 5 and if appropriate the deflection head 5a, and the surface of the layer 2 to be ablated, which comprises in particular means of aspiration and filtering 9 of the ablation residues.

The laser sources 4 are of the YLP type (Ytterbium Fibre Lasers). Each source emits a pulsed laser beam 7 in the infrared domain—advantageously in the near infrared—which has a diameter ranging from 2 to 15 mm and for example equal to 9 mm, said diameter being considered as constant over the whole length of its journey in the air, but the diameter of each beam is reduced during its journey in the device, on account particularly of the focusing lens 6.

As shown in FIG. 3, each impact zone is defined by a centre C and by a characteristic dimension $d_1$, $d_2$, or $d_3$.

Figure 3A:
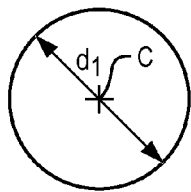
FIGS. 3a, 3b and 3c illustrate different impact zones of laser beams fired in the course of the method according to the invention.
Figure 3B:
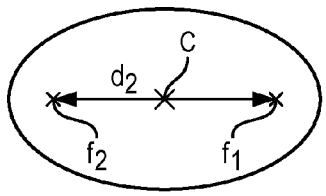
Figure 3C:
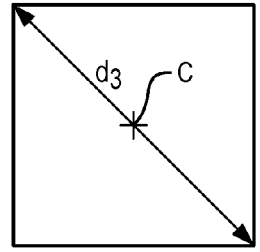

FIGS. 3a, 3b and 3c illustrate respectively three possible but non limiting forms of impacts: circular of characteristic dimension the diameter $d_1$, ellipsoidal of characteristic dimension the distance $d_2$ between the two focal points $f_1$ and $f_2$ of the ellipse, and square of characteristic dimension the diagonal $d_3$.

Each characteristic dimension is of the order of 100 μm.

The confinement unit 8 comprises a throat 10 of substantially truncated shape which is adapted to be assembled by its small base on the frame 3, around the optical deflector 5. The throat 10 is advantageously provided with an external camera 11 which is intended to be applied to the layer 2 to be ablated, said camera 11 being intended for the visualisation of the state of the layer 2 in order to control and command the ablation.

The throat 10 is provided to ensure a dynamic confinement of the gases and aerosols while protecting the operator and, via an air inlet (not represented), it allows a laminar flow of these gases and aerosols in order to recover them in filters 12 equipping the means of aspiration 9, the flow rate of which is 180 m$^3$/h.

These filters 12 are specifically designed so as not to be clogged by the ablation residues, thanks to a prior characterisation of the latter. The choice of the filters 12 depends on the nature, the mass and the size of the particles generated by the ablation.

The ablating device 1 operates in the following manner: the ablating device 1 is put in place against the layer 2 of paint at a distance D of the order of 500 mm from it, via a system of positioning (not illustrated) the confinement unit 8.

Figure 4:
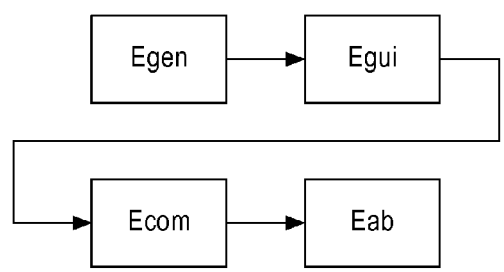
FIG. 4 illustrates steps of the method according to the invention.

Then, the method of ablating the layer 2 of the wall P is implemented. FIG. 4 illustrates the steps of the method.

The ablating method comprises a step $E_{gen}$ of generating a plurality of laser beams by means of a plurality of laser sources and a step $E_{gui}$ of guiding the beams generated by means of a beam guiding device Dg, to an entrance pupil 5b of the optical deflector 5.

Such a guiding device $D_G$ makes it possible to guide in a simple manner at least two beams in the pupil 5b of the optical deflector 5 of the ablating device 1.

The ablating method comprises a step $E_{com}$ of directional control by the optical deflector 5 of a plurality of pulsed laser beams 7 and a step $E_{ab}$ of ablating the layer 2 on impact zones $I_{LC}$ created by the plurality of laser beams, each impact zone $I_{LC}$ being defined by the centre C and by the characteristic dimension $d_1$, $d_2$, $d_3$ (see FIGS. 2a, 2b and 2c).

More precisely, the impact zones $I_{LC}$ are disjointed, the distance $D_I$ between each centre C of the impact zones $I_{LC}$ being equal to at least ten times the largest characteristic dimension $d_1$, $d_2$, $d_3$ of the impact zones.

This distance $D_I$ is preferably equal to at least fifty times the largest characteristic dimension $d_1$, $d_2$, $d_3$ of the impact zones and even more preferentially between fifty and one hundred times the largest characteristic dimension $d_1$, $d_2$, $d_3$ of the zones.

Figure 5:
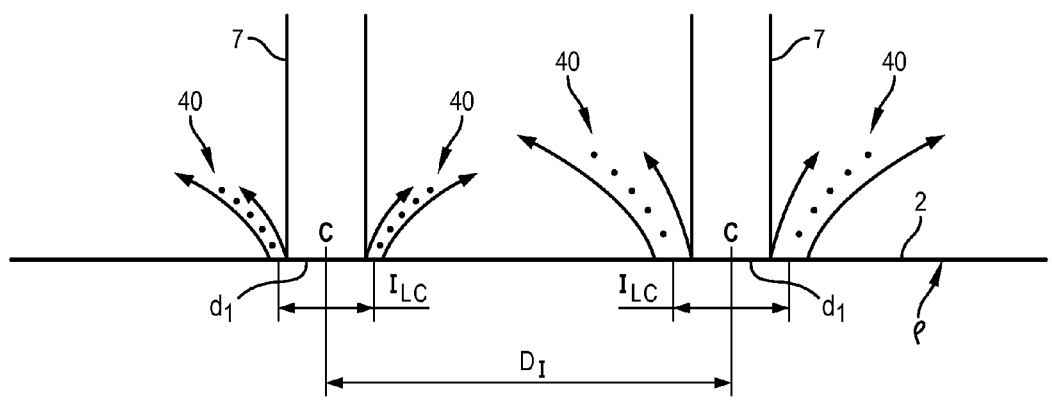
FIG. 5 illustrates a profile view of two laser beams impacting the surface to be ablated.

In FIG. 5 is represented, according to a profile view, two laser beams 7 and the associated impact zones $I_{LC}$.

Given that the impact zones are disjointed, re-depositions of dust of ablated materials are avoided because the distance between the impact zones is such that the dusts have no influence on the other beams 7. In addition, the time synchronisation of the beams is done away with. Indeed, at each impact, dusts 40 of ablated material are projected on either side of the impact zone and, according to the invention, the dusts do not disrupt the ablating method, the distance between the impact zones being sufficient. The pulsed laser beams thus do not need to be synchronised.

The difficult and costly design (because extremely precise) of an optical chain for positioning the impact zones according to the prior art is also done away with. It suffices according to the invention that the distance between the impact zones is sufficient, but there is no precise positioning constraint of the impact zones in relation to each other.

However, to control the zone on which is carried out the sweeping of the surface to be ablated, the zones $I_{LC}$ on the layer are confined in a surface $M_{LC}$ between 0.2 and 4 cm$^2$.

Figure 6:
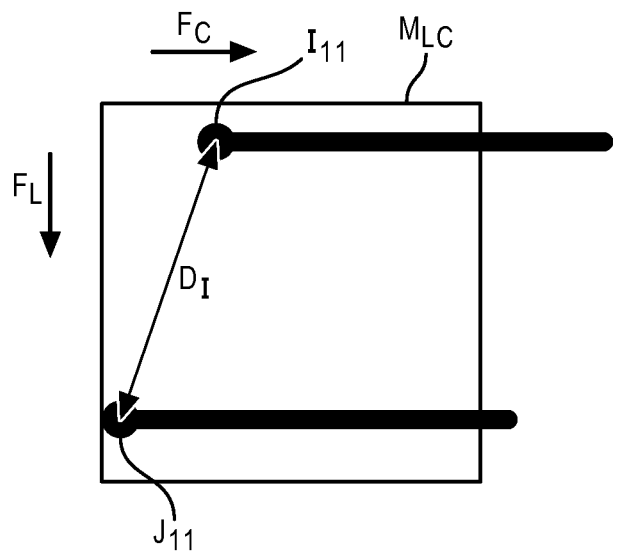
FIG. 6 illustrates a sweeping shot during which two beams are controlled according to the method of the invention.
Figure 7:
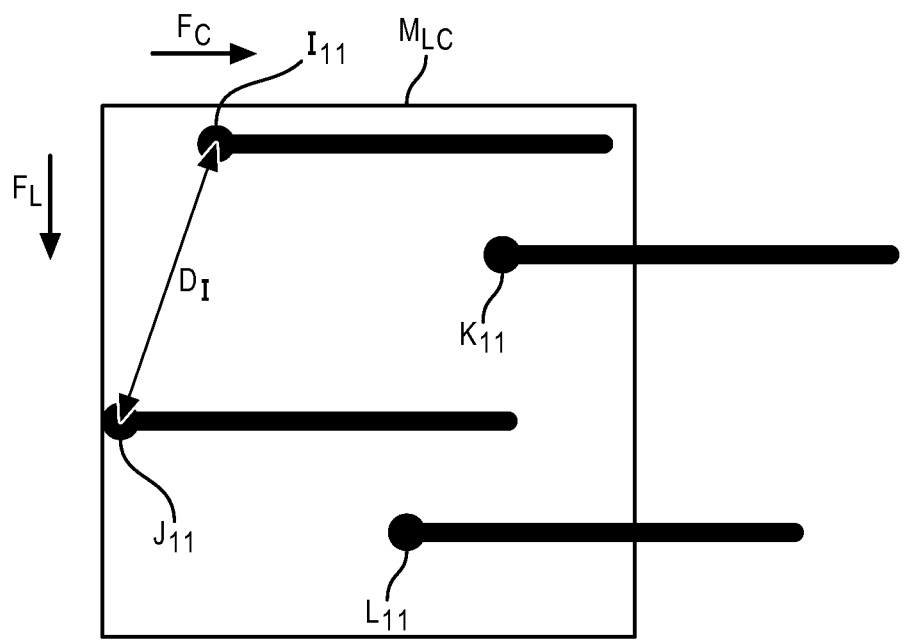
FIG. 7 illustrates a sweeping shot during which four beams are controlled according to the method of the invention.

FIGS. 6 and 7 illustrate a way of sweeping the layer to be ablated according to a movement by column in the direction $F_c$. Such a movement is then completed by a movement by line in the direction $F_L$.

In FIG. 6 is represented a sweep during which two pulsed laser beams are controlled. At each sweep two impact zones $I_{LC}, J_{LC}$ are formed on the layer to be ablated with the index L corresponding to the line and the index C corresponding to the column. Another sweep along the direction $F_C$ could be carried out after a shift along the direction Fl of the set of beams.

Similarly, in FIG. 7 is represented a sweeping shot during which four pulsed laser beams are controlled. At each sweep, four beams forming four impacts $I_{LC}, J_{LC}, K_{LC}, L_{LC}$ with the index L corresponding to the line and the index C to the column.

The guiding device $D_G$ may be implemented in several ways in order to guide the beams to the entrance pupil, the latter being of the order of magnitude of each laser beam.

In FIGS. 8a, 8b, 8c and 8d are represented these different possible implementations of the guiding device.

It should be noted that an implementation will be chosen in relation to fixed size constraints.

Figure 8A:
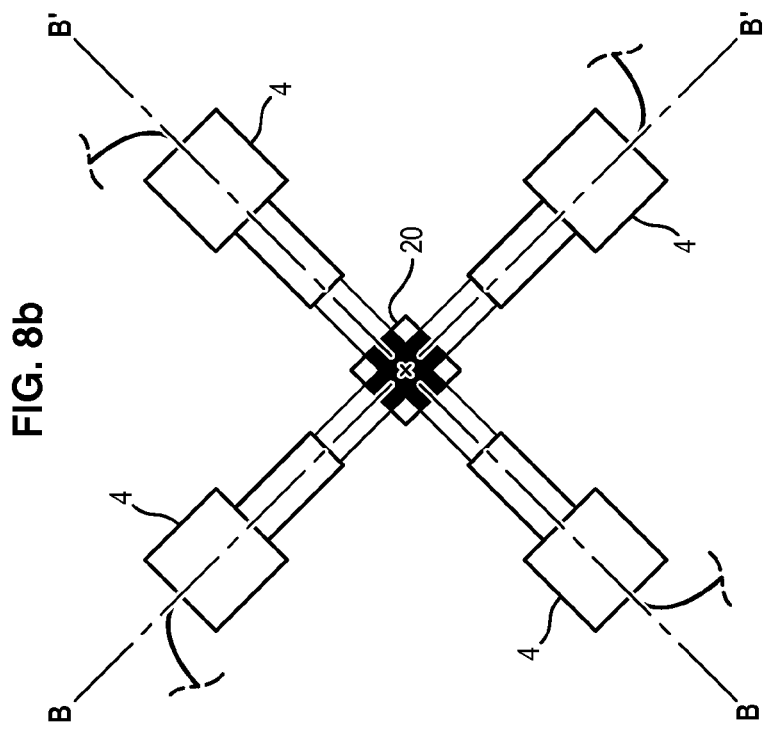

In FIG. 8a, the guiding device $D_G$ comprises two reflecting mirrors $M_1, M_2$ assembled in bayonet configuration. As illustrated in this figure, the laser beams from each source 4 are reflected by a first mirror $M_1$ and the beams from the first mirror $M_1$ are reflected by a second mirror $M_2$ to enter into the optical deflector 5 via the entrance pupil 5b.

Figure 8B:
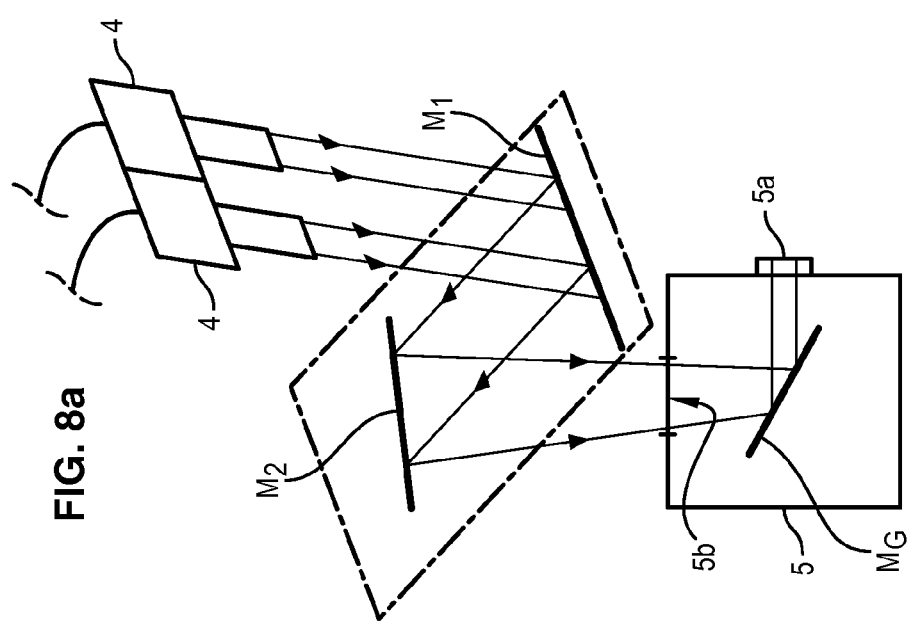

In FIGS. 8b and 8c, the laser sources 4 are arranged in a star shape around a central deflecting prism 20 comprising a number of faces equal to the number of sources 4.

The device thus has a first optical axis BB' between each source 4 and the central deflecting prism 20, and a second optical axis AA' between the central prism 20 and the entrance pupil 5b of the optical deflector 5, each first optical axis AA' and the second optical axis BB' being perpendicular to each other.

In FIG. 8d, the laser sources 4 are arranged in a star shape around a central deflecting prism 20 comprising a number of faces equal to the number of sources 4.

The guiding device $D_G$ comprises a pentaprism 22 associated with each source 4, each pentaprism 22 being able to return the beams from each source with which it is associated to the central deflecting prism 20, the device thus having:

a first optical axis CC' between each source 4 and each pentaprism 22;

a second optical axis BB' between each pentaprism 22 and the central deflecting prism 20; and a third optical axis AA' between the central prism 20 and the entrance pupil 5b of the optical deflector 5.

Each first optical axis CC' is perpendicular to each second optical axis BB' and is parallel to the third optical axis AA'.

The invention claimed is:

1. A method of ablating a surface layer of a wall by sweeping said layer comprising:
   directional controlling by an optical deflector of a plurality of pulsed laser beams; and
   of ablating the layer on impact zones created by the plurality of laser beams, each impact zone being defined by a centre and by a characteristic dimension;
   wherein the impact zones are disjointed, the distance between each centre of the impact zones being equal to at least ten times the largest characteristic dimension of the impact zones.

2. The method according to claim 1, characterised in that the impact zones on the layer are confined within a surface of the order of 1 cm$^2$.

3. The method according to claim 1, further comprising, prior to the control step:
   generating a plurality of pulsed laser beams by means of a plurality of laser sources; and
   guiding beams generated by means of a beam guiding device to an entrance pupil of the optical deflector.

4. The method according to claim 1, wherein the distance between each centre of the impact zones is between fifty times and one hundred times the largest characteristic dimension of the impact zones.

5. A device for the ablation of a surface layer of a wall comprising:
   a plurality of laser sources adapted to generate pulsed laser beams;
   an optical deflector downstream of the laser sources to deflect the beams on a surface layer of a wall; and
   a guiding device adapted to guide the beams generated to an entrance pupil of the optical deflector, the entrance pupil being of the order of magnitude of each laser beam;
   the device being adapted such that the impact zones are disjointed, the distance between each centre of the impact zones being equal to at least ten times the largest characteristic dimension of the impact zones.

6. The device according to claim 5, wherein the guiding device comprises two reflecting mirrors arranged in bayonet configuration and the laser sources are arranged such that all of the beams from said sources are reflected by a first mirror to a second mirror reflecting the beams to the entrance pupil of the optical deflector.

7. The device according to claim 5, wherein the laser sources are arranged in a star shape around a central deflecting prism comprising a number of faces equal to the number of sources, the device having:
   a first optical axis between each source and the central deflecting prism, and
   a second optical axis between the central prism and the entrance pupil of the optical deflector,
   each first optical axis and the second optical axis being perpendicular with each other.

8. The device according to claim 5, wherein the laser sources are arranged in a star shape around a central deflecting prism comprising a number of faces equal to the number of sources, and the guiding device comprises a pentaprism associated with each source, each pentaprism being able to return the beams from each source with which it is associated to the central deflecting prism, the device having:
   a first optical axis between each source and each pentaprism;
   a second optical axis between each pentaprism and the central deflecting prism;
   a third optical axis between the central prism and the entrance pupil of the optical deflector;
   each first optical axis being perpendicular to each second optical axis and being parallel to the third optical axis.

* * * * *